United States Patent
Sato et al.

(10) Patent No.: US 10,385,225 B2
(45) Date of Patent: Aug. 20, 2019

(54) NON-AQUEOUS INKJET ORANGE INK COMPOSITION AND INK SET USING THE SAME

(71) Applicant: SAKATA INX CORPORATION, Osaka-shi, Osaka (JP)

(72) Inventors: Yoichi Sato, Osaka (JP); Okinori Nakashima, Osaka (JP); Yoshiyuki Aoki, Osaka (JP); Jun Kinjyo, Osaka (JP); Ryohei Miyake, Osaka (JP)

(73) Assignee: SAKATA INX CORPORATION, Osaka (JP)

( * ) Notice: Subject to any disclaimer, the term of this patent is extended or adjusted under 35 U.S.C. 154(b) by 0 days.

(21) Appl. No.: 16/070,756

(22) PCT Filed: Jan. 12, 2017

(86) PCT No.: PCT/JP2017/000760
§ 371 (c)(1),
(2) Date: Jul. 17, 2018

(87) PCT Pub. No.: WO2017/126402
PCT Pub. Date: Jul. 27, 2017

(65) Prior Publication Data
US 2019/0161632 A1 May 30, 2019

(30) Foreign Application Priority Data

Jan. 22, 2016 (JP) .................. 2016-010805

(51) Int. Cl.
| | |
|---|---|
| C09D 11/36 | (2014.01) |
| C09D 11/322 | (2014.01) |
| B41J 2/01 | (2006.01) |
| B41M 5/00 | (2006.01) |
| C09B 33/147 | (2006.01) |
| C09B 51/00 | (2006.01) |
| C09B 57/00 | (2006.01) |
| C09D 11/033 | (2014.01) |
| C09D 11/037 | (2014.01) |
| C09D 11/106 | (2014.01) |

(52) U.S. Cl.
CPC ............... C09D 11/322 (2013.01); B41J 2/01 (2013.01); B41M 5/00 (2013.01); B41M 5/0023 (2013.01); C09B 33/147 (2013.01); C09B 51/00 (2013.01); C09B 57/004 (2013.01); C09D 11/033 (2013.01); C09D 11/037 (2013.01); C09D 11/106 (2013.01); C09D 11/36 (2013.01)

(58) Field of Classification Search
CPC ... C09D 11/033; C09D 11/037; C09D 11/106; C09D 11/322; C09D 11/36
See application file for complete search history.

(56) References Cited

U.S. PATENT DOCUMENTS

| | | | | |
|---|---|---|---|---|
| 7,311,769 | B2* | 12/2007 | Weber ................. | C08K 5/0041 106/494 |
| 7,494,538 | B2* | 2/2009 | Koganehira ......... | C09D 11/326 106/31.6 |
| 2007/0125263 | A1 | 6/2007 | Weber et al. | |

FOREIGN PATENT DOCUMENTS

| | | |
|---|---|---|
| JP | 2007514804 A | 6/2007 |
| JP | 2007297596 A | 11/2007 |
| JP | 2009227812 A | 10/2009 |
| JP | 2009255063 A | 11/2009 |
| WO | 2005049737 A1 | 6/2005 |

OTHER PUBLICATIONS

International Search Report (ISR) dated Mar. 14, 2017, issued for International application No. PCT/JP2017/000760.
Notification Concerning Transmittal of International Preliminary Report on Patentability (PCT/IB326) and Notification of Transmittal of Translation of the International Preliminary Report on Patentability (PCT/IB/338) dated Aug. 2, 2018, with International Preliminary Report on Patentability (PCT/IB/373) and Written Opinion of the International Searching Authority (PCT/ISA/237), for corresponding international application PCT/JP2017/000760.

* cited by examiner

Primary Examiner — Vu A Nguyen
(74) Attorney, Agent, or Firm — Law Office of Katsuhiro Arai

(57) ABSTRACT

A non-aqueous inkjet orange ink composition includes a pigment, a pigment dispersant, and an organic solvent, wherein the pigment contains C.I. Pigment Orange 36 and at least one type of pigment selected from C.I. Pigment Red 242, C.I. Pigment Red 254, and C.I. Pigment Orange 71. The non-aqueous inkjet orange ink composition can offer high weather resistance, good color development property, and excellent dispersion stability, as well as an ink set using such ink composition.

12 Claims, No Drawings ated at once, instead of having to attach smaller sheets together as has traditionally been done.

NON-AQUEOUS INKJET ORANGE INK COMPOSITION AND INK SET USING THE SAME

This application is the U.S. National Phase under 35 U.S.C. § 371 of International Application PCT/JP2017/000760, filed Jan. 12, 2017, which claims priority to Japanese Patent Application No. 2016-010805, filed Jan. 22, 2016. The International Application was published under PCT Article 21(2) in a language other than English.

TECHNICAL FIELD

The present invention relates to a nonaqueous inkjet orange ink composition which is highly weather resistant and suitable for use in the manufacturing of a large-size signboard ad, etc., whose printing surface is primarily constituted by a vinyl chloride polymer or ethylene-vinyl acetate copolymer, as well as an ink set using such ink composition.

BACKGROUND ART

An increasing number of recent signboard ads are featuring logos and patterns of vivid colors and sophisticated designs or are photographic in nature capturing the appearances of products, faces of people, etc. In terms of signboard sizes, a considerable number of signboards are now large in size, so they have stronger impact on the people who see them.

Traditional methods for producing signboard ads generally involve cutting colored sheets into the shapes of letters and then attaching the letters to create logos, or using various printing machines to create photographic ads. This presents such problems as requiring a lot of time and labor, and large equipment such as printing machines, to produce signboard ads.

Accordingly, attempts are made to make it easier to produce signboards featuring vivid images using the inkjet method that allows a design created on a personal computer to be printed directly onto a base material.

The inkjet method is characterized in that it supports a wide range of materials for use as printing base materials, making printing onto paper sheets, polymer sheets, metal sheets, and sheets made of other hard or soft materials, easy and convenient. Signboard ads and the like that are installed outdoors must meet such performance requirements as being lightweight, excellent in strength and durability, resistant to rain, and inexpensive, which makes the ability to easily print on polymer sheets having these characteristics a great advantage.

In addition, super-wide-format inkjet printers having a printing width of 2,000 mm or greater have also emerged of late, making signboard production much easier by allowing a large sheet to be printed at once, instead of having to attach smaller sheets together as has traditionally been done.

In general, polymer sheets called "tarpaulins" are often used for signboard ads. A tarpaulin is a composite sheet comprising a polyester or polyamide as core material, and polyvinyl chloride, ethylene-vinyl acetate copolymer, or other vinyl polymer layers stacked on top and bottom of the core material.

Among the inkjet ink compositions with which to print these composite sheets, non-aqueous inkjet ink compositions based on organic solvents (or environmentally-friendly organic solvents lately) are used.

Wide-format inkjet printers carrying ink compositions of orange, green, and other special colors to further expand the color ranges are available on the market lately (refer to Patent Literature 1, for example). However, many of traditional orange ink compositions are relatively low in weather resistance, which gives rise to a need for orange ink compositions offering high weather resistance.

BACKGROUND ART LITERATURE

Patent Literature

Patent Literature 1: Japanese Patent Laid-open No. 2009-227812

SUMMARY OF THE INVENTION

Problems to Be Solved by the Invention

An object of the present invention is to provide a non-aqueous inkjet orange ink composition offering high weather resistance, good color development property, and excellent dispersion stability, as well as an ink set using such ink composition.

Means for Solving the Problems

After studying in earnest to achieve the aforementioned object, the inventors of the present invention completed the present invention by finding that the aforementioned object could be achieved with a non-aqueous inkjet orange ink composition prepared by using, as pigments, C.I. Pigment Orange 36 and at least one type of pigment selected from C.I. Pigment Red 242, C.I. Pigment Red 254, and C.I. Pigment Orange 71, as well as a pigment dispersant.

To be specific, the present invention is as follows.

1. A non-aqueous inkjet orange ink composition containing a pigment, a pigment dispersant, and an organic solvent, wherein the pigment contains:
   C.I. Pigment Orange 36; and
   at least one pigment selected from C.I. Pigment Red 242, C.I. Pigment Red 254, and C.I. Pigment Orange 71.

2. A non-aqueous inkjet orange ink composition according to 1, wherein the ratio by mass of C.I. Pigment Orange 36 to the at least one type of pigment selected from C.I. Pigment Red 242, C.I. Pigment Red 254, and C.I. Pigment Orange 71, expressed by (C.I. Pigment Orange 36)/(At least one pigment selected from C.I. Pigment Red 242, C.I. Pigment Red 254, and C.I. Pigment Orange 71), falls in a range of 95/5 to 40/60.

3. A non-aqueous inkjet orange ink composition according to 1 or 2, wherein the ratio by mass of C.I. Pigment Orange 36 to the at least one pigment selected from C.I. Pigment Red 242, C.I. Pigment Red 254, and C.I. Pigment Orange 71, expressed by (C.I. Pigment Orange 36)/(At least one pigment selected from C.I. Pigment Red 242, C.I. Pigment Red 254, and C.I. Pigment Orange 71), falls in a range of 9/3 to 7/3.

4. A non-aqueous inkjet orange ink composition according to any one of 1 to 3, which contains, as a binder resin, at least one resin selected from the group consisting of vinyl chloride polymers, vinyl chloride-vinyl acetate copolymers, ethylene-vinyl acetate copolymers, and acrylic resins.

5. A non-aqueous inkjet orange ink composition according to any one of 1 to 4, wherein the pigment dispersant is a basic group-containing polymer pigment dispersant.

MODE FOR CARRYING OUT THE INVENTION

The non-aqueous inkjet orange ink composition and ink set using such ink composition, as proposed by the present invention, are explained below.

First, the non-aqueous inkjet orange ink composition proposed by the present invention is explained.

(Pigment)

The pigment constituting the non-aqueous inkjet orange ink composition proposed by the present invention comprises C.I. Pigment Orange 36 and at least one type of pigment selected from C.I. Pigment Red 242, C.I. Pigment Red 254, and C.I. Pigment Orange 71, from the viewpoints of weather resistance, dispersion stability, and color development property.

The ratio of C.I. Pigment Orange 36 to the at least one type of pigment selected from C.I. Pigment Red 242, C.I. Pigment Red 254, and C.I. Pigment Orange 71, expressed by (C.I. Pigment Orange 36)/(At least one type of pigment selected from C.I. Pigment Red 242, C.I. Pigment Red 254, and C.I. Pigment Orange 71), is in a range of 95/5 to 40/60, or preferably in a range of 95/5 to 50/50, or more preferably in a range of 93:7 to 70:30, or even more preferably in a range of 90/10 to 80/20.

If there is too much C.I. Pigment Orange 36, the color development property worsens.

If there is too little C.I. Pigment Orange 36, on the other hand, the dispersion stability worsens along with the color development property when primarily C.I. Pigment Red 242 is used as the other pigment, the color development property worsens when primarily C.I. Pigment Red 254 is used as the other pigment, and the weather resistance worsens when primarily C.I. Pigment Orange 71 is used as the other pigment.

Furthermore, other orange pigments and pigments, etc., of other colors can also be combined, to the extent that doing so does not reduce the effects of the present invention.

And, preferably the ratio of the sum of C.I. Pigment Orange 36 and the at least one type of pigment selected from C.I. Pigment Red 242, C.I. Pigment Red 254 and C.I. Pigment Orange 71, in the solid contents of the non-aqueous inkjet orange ink composition proposed by the present invention, is in a range of 1.0 to 15.0 percent by mass.

(Pigment Dispersant)

For the pigment dispersant constituting the non-aqueous inkjet orange ink composition proposed by the present invention, an ionic or non-ionic low-molecular-weight surface-active agent, basic group-containing polymer pigment dispersant, acid group-containing polymer pigment dispersant, non-ionic polymer pigment dispersant, etc., may be used. Among these, a basic group-containing polymer compound as mentioned above, especially a polymer pigment dispersant containing basic and acid groups, is preferred. To be specific, Ajispar manufactured by Ajinomoto Fine Techno, Solsperse manufactured by Lubrizol Japan, Disperbyk manufactured by BYK, and Efka manufactured by BASF, and the like are preferred. Any one type of these pigment dispersants may be used alone, or two or more types may be mixed.

The blending quantity of the pigment dispersant relative to the pigment can be set in any way as deemed appropriate; from the viewpoint of pigment dispersibility, however, preferably it is, based on ratio by mass, 0.05 to 1.0 parts by mass relative to 1 part by mass of the pigment.

(Organic Solvent)

For the organic solvent constituting the non-aqueous inkjet orange ink composition proposed by the present invention, at least one type of organic solvent selected from alkylene glycol dialkyl ethers that are liquid at normal temperature and normal pressure, is used. The alkylene glycol dialkyl ethers may be (poly)ethylene glycol dialkyl ethers and/or (poly)propylene glycol dialkyl ethers; however, preferably the primary organic solvent is a (poly)ethylene glycol dialkyl ether from the viewpoint of drying property, etc. Examples of (poly)ethylene glycol dialkyl ethers include ethylene glycol diethyl ether, ethylene glycol dimethyl ether, ethylene glycol ethyl methyl ether, diethylene glycol ethyl methyl ether, diethylene glycol dimethyl ether, diethylene glycol diethyl ether, diethylene glycol dibutyl ether, triethylene glycol dimethyl ether, triethylene glycol diethyl ether, tetraethylene glycol dimethyl ether, and the like. Examples of (poly)propylene glycol dialkyl ethers include propylene glycol dimethyl ether, propylene glycol diethyl ether, dipropylene glycol dimethyl ether, dipropylene glycol diethyl ether, and the like.

Additionally, for the purpose of improving the image quality, preferably at least one type of organic solvent selected from cyclic ester compounds, (poly)propylene glycol monoalkyl ethers, and (poly)propylene glycol monoalkyl ether monoalkyl esters is combined. To be specific, cyclic ester compounds include γ-butyrolactone, γ-valerolactone, γ-caprolactone, γ-capryrolactone, γ-laurolactone, γ-lactone, δ-valerolactone and other δ-lactone, ε-caprolactone, εlactone and other cyclic ester compounds, and propylene carbonate and other cyclic carbonic acid ester compounds. Among the aforementioned cyclic ester compounds, γ-butyrolactone and propylene carbonate are particularly preferred. (Poly)propylene glycol monoalkyl ethers include propylene glycol monomethyl ether, propylene glycol monoethyl ether, propylene glycol monobutyl ether, dipropylene glycol monomethyl ether, and dipropylene glycol monoethyl ether. Among the aforementioned (poly)propylene glycol monoalkyl ethers, dipropylene glycol monomethyl ether is particularly preferred. (Poly)propylene glycol monoalkyl ether monoalkyl esters include propylene glycol monomethyl ether acetate, propylene glycol monoethyl ether acetate, propylene glycol monobutyl ether acetate, dipropylene glycol monomethyl ether acetate, dipropylene glycol monoethyl ether acetate, and dipropylene glycol monobutyl ether acetate. Among the aforementioned (poly)polypropylene glycol monoalkyl ether monoalkyl esters, dipropylene glycol monomethyl ether acetate is particularly preferred.

In the non-aqueous inkjet orange ink composition proposed by the present invention, preferably the at least one type selected from cyclic ester compounds, (poly)propylene glycol monoalkyl ethers, and (poly)propylene glycol monoalkyl ether monoalkyl esters is contained so that the total quantity of cyclic ester compounds, (poly)propylene glycol monoalkyl ethers, and (poly)propylene glycol monoalkyl ether monoalkyl esters falls in a range of 1 to 20 percent by mass. If the content exceeds 20 percent by mass, the drying property tends to drop; if the content is lower than 1 percent by mass, on the other hand, the image quality may not improve.

In addition, organic solvents other than the above that may be used as necessary include ethylene glycol, diethylene glycol, triethylene glycol, propylene glycol, ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether, triethylene glycol monobutyl ether, tetraethylene glycol monobutyl ether, and other (poly)ethylene glycol monoethers, ethylene glycol monomethyl acetate, ethylene glycol monoethyl acetate, ethylene glycol monobutyl acetate, diethylene glycol monomethyl acetate, triethylene glycol monomethyl acetate, and other (poly)ethylene glycol monoether monoesters, ethylene glycol diacetate, diethylene glycol diacetate, triethylene glycol diacetate, and other (poly)ethylene glycol diesters, ethylene glycol monomethyl ether acetate, ethylene glycol monoethyl ether acetate, ethylene glycol monobutyl ether acetate, diethylene glycol monomethyl ether acetate, diethylene glycol monoethyl ether acetate, diethylene glycol monobutyl ether acetate, diethylene glycol propyl ether acetate, triethylene glycol monobutyl ether, triethylene glycol ethyl ether acetate, triethylene glycol butyl ether acetate and other (poly)ethylene glycol monoether monoesters, propylene glycol monoacetate, and other (poly)propylene glycol monoesters, propylene glycol diacetate, dipropylene glycol diacetate, and other (poly)propylene glycol diesters, trimethyl pentane diol diisobutylate, hexyl acetate, octyl acetate, methyl lactate, ethyl lactate, butyl lactate, and other ester-based organic solvents.

Preferred combinations of these organic solvents from the viewpoints of solid filling and other image quality properties, drying property of the printed matter, etc., include combinations of (poly)alkylene glycol dialkyl ether and at least one type selected from cyclic ester compounds, (poly)propylene glycol monoalkyl ethers, and (poly)propylene glycol monoalkyl ether monoalkyl esters, or more preferably combinations of diethylene glycol dialkyl ether, triethylene glycol dialkyl ether, and at least one type selected from γ-butyrolactone, propylene carbonate, dipropylene glycol monomethyl ether, and dipropylene glycol monomethyl ether acetate.

Also, preferably the total quantity of organic solvents accounts for 80 to 98 percent by mass in the non-aqueous inkjet orange ink composition. If the aforementioned total quantity exceeds 98 percent by mass, the printability of the obtained ink drops; if the total quantity is smaller than 80 percent by mass, on the other hand, a rise of ink viscosity is induced and the ease of discharging the ink from the nozzle tends to drop, which is not desirable.

(Binder Resin)

For the binder resin constituting the non-aqueous inkjet orange ink composition proposed by the present invention, at least one type selected from the group that includes vinyl chloride polymers, vinyl chloride-vinyl acetate copolymers, ethylene-vinyl acetate copolymers, and acrylic resins is used.

Vinyl chloride polymers include homopolymers of vinyl chloride (polyvinyl chlorides), and copolymers of vinyl chloride, and small quantities of other monomers copolymerizable therewith (such as vinyl acetate, ethylene and vinylidene chloride). Specific examples include TK-500 (manufactured by Shin-Etsu Chemical).

Any vinyl chloride-vinyl acetate copolymer or ethylene-vinyl acetate copolymer may be used without limitation so long as it is normally used for inks of this type. Specific examples include Solbin CL, CNL, C5R, TA3, TA5R (all manufactured by Nissin Chemical Industry), Vinnol E15/45, H14/36, H40/43, E15/45M, E15/40M (all manufactured by Wacker Chemie), Evaflex 45X (manufactured by Mitsui-DuPont Polychemical), and the like.

Preferably the molecular weight of any such vinyl polymer is approx. 2000 to 100000 in weight-average molecular weight from the viewpoints of solubility in the solvent, viscosity of the obtained ink composition, discharge stability, etc.

Acrylic resins include polymers constituted by (meth)acrylates soluble in organic solvents, copolymers thereof, or the like. Such (meth)acrylates include, for example: ethyl, propyl or butyl (meth)acrylates and other alkyl (meth)acrylates; and hydroxy methyl, hydroxy ethyl, hydroxy propyl, hydroxy butyl, hydroxy pentyl (meth)acrylates and other hydroxy alkyl (meth)acrylates, and the like. Among these acrylic resins, preferably (1) an acrylic resin whose glass transition temperature is 90 to 110° C. and mass-average molecular weight is 20000 to 40000, and (2) an acrylic resin whose glass transition temperature is 65 to 85° C. and mass-average molecular weight is 50000 to 80000, are contained at a ratio of (1)/(2)=(70 to 90)/(30 to 10).

Specific examples of acrylic resins that may be used include BR-60 (Tg: 75° C.), BR-64 (Tg: 55° C.), BR-75 (Tg: 90° C.), BR-77 (Tg: 80° C.), BR-87 (Tg: 105° C.), BR-88 (Tg: 105° C.), BR-90 (Tg: 65° C.), BR-93 (Tg: 50° C.), BR-95 (Tg: 80° C.), BR-105 (Tg: 50° C.), BR-106 (Tg: 50° C.), BR-107 (Tg: 50° C.), BR-108 (Tg: 90° C.), BR-113 (Tg: 75° C.), BR-115 (Tg: 50° C.), BR-116 (Tg: 50° C.) manufactured by Mitsubishi Rayon, and the like.

The use quantity of binder resin based on the sum of vinyl polymers and acrylic resins is preferably in a range of 1 to 15 percent by mass, or more preferably in a range of 1 to 7 percent by mass, relative to the total quantity of non-aqueous inkjet orange ink composition. If the use quantity of binder resin is smaller than 1 percent by mass, sufficient fixability on the base material is not achieved; if the use quantity exceeds 15 percent by mass, on the other hand, the solid contents become excessive and the discharge stability drops. It should be noted that resins other than the aforementioned binder resins, such as styrene-acrylic resins, styrene-maleate resins, rosin resins, rosin ester resins, petroleum resins, coumarone indene resins, terpene phenol resins, phenol resins, urethane resins, melamine resins, urea resins, epoxy resins, cellulose resins, xylene resins, alkyd resins, aliphatic hydrocarbon resins, butyral resins, maleate resins, fumarate resins, etc., may also be used, to the extent that doing so does not reduce the performance.

(Pigment Dispersion Aid)

In the non-aqueous inkjet orange ink composition proposed by the present invention, a pigment dispersion aid may also be used to improve the pigment dispersibility further.

(Other Components)

Additionally, in the non-aqueous inkjet orange ink composition proposed by the present invention, various additives that can be added to non-aqueous inkjet orange ink compositions, such as surface-active agent, plasticizer, surface-adjusting agent, ultraviolet protective agent, photostabilizer, antioxidant, etc., may be used as necessary.

[Manufacturing of Non-aqueous Inkjet Orange Ink Composition]

Next, how to manufacture the non-aqueous inkjet orange ink composition proposed by the present invention using these materials is explained.

The non-aqueous inkjet orange ink composition proposed by the present invention can be obtained by, for example, dispersing and mixing the respective components using a wet-type circulation mill, bead mill, ball mill, sand mill, attritor, roll mill, agitator, Henschel mixer, colloid mill, ultrasonic homogenizer, high-pressure homogenizer (Microfluidizer, Nanomizer, Ultimizer, Genus PY, DeBEE2000, etc.), pearl mill or other dispersion machine, and then making adjustments so that the non-aqueous inkjet orange ink composition has a viscosity of 2 to 10 mPa·s.

A printed matter can be obtained by printing, with an inkjet printer, on a base material whose surface layer at least is constituted by a vinyl chloride polymer or ethylene-vinyl acetate copolymer, using the non-aqueous inkjet orange ink composition proposed by the present invention as obtained above.

EXAMPLES

The present invention is explained in greater detail below by citing examples; however, the present invention is not at all limited to these examples. It should be noted that, unless otherwise specified, "%" means "percent by mass," while "part" means "part by mass."

<(Manufacturing of C.I. Pigment Orange 36 Dispersion)>
Ten parts of pigment dispersant (SS39000) were dissolved in 70 parts of diethylene glycol diethyl ether, after which 20 parts of pigment were mixed in under agitation, and then the resulting mixture was kneaded using a bead mill to obtain a non-aqueous inkjet base ink.

<(Manufacturing of C.I. Pigment Red 242 Dispersion)>
Ten parts of pigment dispersant (SS39000) were dissolved in 70 parts of diethylene glycol diethyl ether, after which 20 parts of pigment were mixed in under agitation, and then the resulting mixture was kneaded using a bead mill to obtain a non-aqueous inkjet base ink.

<(Manufacturing of C.I. Pigment Red 254 Dispersion)>
Ten parts of pigment dispersant (SS39000) were dissolved in 70 parts of diethylene glycol diethyl ether, after which 20 parts of pigment were mixed in under agitation, and then the resulting mixture was kneaded using a bead mill to obtain a non-aqueous inkjet base ink.

<(Manufacturing of C.I. Pigment Orange 71 Dispersion)>
Ten parts of pigment dispersant (SS39000) were dissolved in 70 parts of diethylene glycol diethyl ether, after which 20 parts of pigment were mixed in under agitation, and then the resulting mixture was kneaded using a bead mill to obtain a non-aqueous inkjet base ink.

(Non-Aqueous Inkjet Orange Ink Compositions of Examples 1 to 10 and Comparative Examples 1 to 4)

The materials were mixed under agitation according to the ratios in Table 1, to obtain the non-aqueous inkjet orange ink compositions of Examples 1 to 10 and Comparative Examples 1 to 4.

<Evaluation>
(Dispersion Stability)

The non-aqueous inkjet orange ink compositions of Examples 1 to 10 and Comparative Examples 1 to 4 were put in sealed containers and let stand for one week in an environment of 60° C., and then measured for change in viscosity, with the measured results evaluated as described below. Viscosity was measured at 25° C. using a viscometer (RE100L manufactured by Toki Sangyo).

Evaluation Standards
A: The rate of change in viscosity is lower than 5%.
B: The rate of change in viscosity is 5% or higher, but lower than 10%.
C: The rate of change in viscosity is 10% or higher.

(Color Development Property)

Color-applied media were measured for chroma c* using a spectrophotometer (product name "Spectro Eye" manufactured by X-Rite) to evaluate the color development property. It should be noted that chroma can be obtained using the formula $c^* = \{(a^*)2 + (b^*)2\} \times \frac{1}{2}$. A Φ0.15 Meyer bar was used to apply the colors onto vinyl chloride medium, after which the colors were measured to evaluate the color development property according to the evaluation standards below.

Evaluation Standards
A: c* is 100 or higher.
B: c* is 90 or higher but lower than 100.
C: c* is lower than 90.

(Weather Resistance)

A Φ0.15 Meyer bar was used to apply the colors onto vinyl chloride media, which were then put through a 1000-hour test under the following conditions using a weather resistance tester (product name "Q-SUN" manufactured by Q-Lab) and then measured for color difference ΔE using a spectrophotometer, to evaluate the weather resistance. It should be noted that color difference ΔE can be obtained using the formula $\Delta E = \{\Delta L2 + (\Delta a^*)2 + (\Delta b^*)2\} \times \frac{1}{2}$.

Weather resistance test conditions (1 cycle): Light: 102 min (0.35 W/m²; 340 nm, 63° C.) Water spray: 18 min Evaluation Standards
A: ΔE is 10 or lower.
B: ΔE is 10 or higher but lower than 20.
C: ΔE is 20 or higher.

TABLE 1

| | | Example | | | | | | |
|---|---|---|---|---|---|---|---|---|
| | | 1 | 2 | 3 | 4 | 5 | 6 | 7 |
| Pigment | C.I. Pigment Orange 36 | 2.00 | 2.80 | 3.20 | 3.80 | 3.20 | 3.80 | 2.80 |
| | C.I. Pigment Red 242 | 2.00 | 1.20 | 0.80 | 0.20 | — | — | — |
| | C.I. Pigment Red 254 | — | — | — | — | 0.80 | 0.20 | — |
| | C.I. Pigment Orange 71 | — | — | — | — | — | — | 1.20 |
| Solvent | Diethylene glycol diethyl ether | 51.00 | 51.00 | 51.00 | 51.00 | 51.00 | 51.00 | 51.00 |
| | Propylene carbonate | 20.00 | 20.00 | 20.00 | 20.00 | 20.00 | 20.00 | 20.00 |
| | Tetraethylene glycol dimethyl ether | 20.00 | 20.00 | 20.00 | 20.00 | 20.00 | 20.00 | 20.00 |
| Dispersant | SS39000 | 2.00 | 2.00 | 2.00 | 2.00 | 2.00 | 2.00 | 2.00 |
| Resin | Vinyl chloride-vinyl acetate resin (E15/45) | 3.00 | 3.00 | 3.00 | 3.00 | 3.00 | 3.00 | 3.00 |
| | Vinyl chloride resin (TK-500) | | | | | | | |
| | Ethylene-vinyl acetate resin (Evaflex 45X) | | | | | | | |
| Total | | 100 | 100 | 100 | 100 | 100 | 100 | 100 |
| Evaluation | Viscosity | 4.7 | 4.4 | 4.3 | 4.3 | 4.1 | 4.2 | 4.3 |
| | Dispersion stability | B | B | A | A | A | A | A |

TABLE 1-continued

|  |  |  |  |  |  |  |  |  |
|---|---|---|---|---|---|---|---|---|
|  | Weather resistance | B | A | A | A | A | A | B |
|  | Color development property | B | A | A | B | B | B | A |

|  |  | Example | | | Comparative Example | | | |
|---|---|---|---|---|---|---|---|---|
|  |  | 8 | 9 | 10 | 1 | 2 | 3 | 4 |
| Pigment | C.I. Pigment Orange 36 | 3.60 | 3.20 | 3.20 | 4.00 | 0.20 | 0.20 | 0.20 |
|  | C.I. Pigment Red 242 | — | 0.80 | 0.80 | — | 3.80 | — | — |
|  | C.I. Pigment Red 254 | — | — | — | — | — | 3.80 | — |
|  | C.I. Pigment Orange 71 | 0.40 | — | — | — | — | — | 3.80 |
| Solvent | Diethylene glycol diethyl ether | 51.00 | 51.00 | 51.00 | 51.00 | 51.00 | 51.00 | 51.00 |
|  | Propylene carbonate | 20.00 | 20.00 | 20.00 | 20.00 | 20.00 | 20.00 | 20.00 |
|  | Tetraethylene glycol dimethyl ether | 20.00 | 20.00 | 20.00 | 20.00 | 20.00 | 20.00 | 20.00 |
| Dispersant | SS39000 | 2.00 | 2.00 | 2.00 | 2.00 | 2.00 | 2.00 | 2.00 |
| Resin | Vinyl chloride-vinyl acetate resin (E15/45) | 3.00 |  |  | 3.00 | 3.00 | 3.00 | 3.00 |
|  | Vinyl chloride resin (TK-500) |  | 3.00 |  |  |  |  |  |
|  | Ethylene-vinyl acetate resin (Evaflex 45X) |  |  | 3.00 |  |  |  |  |
| Total |  | 100 | 100 | 100 | 100 | 100 | 100 | 100 |
| Evaluation | Viscosity | 4.2 | 4.7 | 4.3 | 4.2 | 5.1 | 4.2 | 4.3 |
|  | Dispersion stability | A | A | A | A | C | A | A |
|  | Weather resistance | A | A | A | A | B | A | C |
|  | Color development property | A | A | A | C | C | C | A |

E15/45: Vinnol E15/45 (manufactured by Wacker Chemie)
TK-500: TK-500 (manufactured by Shin-Etsu Chemical)
Evaflex 45X: Evaflex 45X (manufactured by Mitsui-DuPont Polychemical)
SS39000: Solsperse 39000 (manufactured by Lubrizol Japan)

According to Examples 1 to 10, non-aqueous inkjet orange ink compositions of proper viscosities were obtained, which also exhibited excellent dispersion stability, weather resistance, and color development property. By contrast, Comparative Example 1 in which C.I. Pigment Orange 36 alone was used as the pigment showed poor color development property. Also, Comparative Example 2 in which 0.20 of C.I. Pigment Orange 36 and 3.80 of C.I. Pigment Red 242 were mixed as the pigment, had a slightly higher viscosity and poor dispersion stability and color development property. Comparative Example 3 in which 0.20 of C.I. Pigment Orange 36 and 3.80 of C.I. Pigment Red 254 were mixed as the pigment, demonstrated poor color development property. Comparative Example 4 in which 0.20 of C.I. Pigment Orange 36 and 3.80 of C.I. Pigment Orange 71 were mixed as the pigment, showed poor weather resistance.

What is claimed is:

1. A non-aqueous inkjet orange ink composition comprising a pigment, a pigment dispersant, and an organic solvent, wherein the pigment contains:
   C.I. Pigment Orange 36; and
   at least one pigment selected from C.I. Pigment Red 242, C.I. Pigment Red 254, and C.I. Pigment Orange 71.

2. The non-aqueous inkjet orange ink composition according to claim 1, wherein a ratio by mass of C.I. Pigment Orange 36 to the at least one pigment selected from C.I. Pigment Red 242, C.I. Pigment Red 254, and C.I. Pigment Orange 71, expressed by (C.I. Pigment Orange 36)/(At least one pigment selected from C.I. Pigment Red 242, C.I. Pigment Red 254, and C.I. Pigment Orange 71), falls in a range of 95/5 to 40/60.

3. The non-aqueous inkjet orange ink composition according to claim 1, wherein a ratio by mass of C.I. Pigment Orange 36 to the at least one pigment selected from C.I. Pigment Red 242, C.I. Pigment Red 254, and C.I. Pigment Orange 71, expressed by (C.I. Pigment Orange 36)/(At least one pigment selected from C.I. Pigment Red 242, C.I. Pigment Red 254, and C.I. Pigment Orange 71), falls in a range of 9/3 to 7/3.

4. The non-aqueous inkjet orange ink composition according to claim 1, which contains, as a binder resin, at least one resin selected from the group consisting of vinyl chloride polymers, vinyl chloride-vinyl acetate copolymers, ethylene-vinyl acetate copolymers, and acrylic resins.

5. The non-aqueous inkjet orange ink composition according to claim 1, wherein the pigment dispersant is a basic group-containing polymer pigment dispersant.

6. The non-aqueous inkjet orange ink composition according to claim 2, which contains, as a binder resin, at least one resin selected from the group consisting of vinyl chloride polymers, vinyl chloride-vinyl acetate copolymers, ethylene-vinyl acetate copolymers, and acrylic resins.

7. The non-aqueous inkjet orange ink composition according to claim 2, wherein the pigment dispersant is a basic group-containing polymer pigment dispersant.

8. The non-aqueous inkjet orange ink composition according to claim 3, which contains, as a binder resin, at least one resin selected from the group consisting of vinyl chloride polymers, vinyl chloride-vinyl acetate copolymers, ethylene-vinyl acetate copolymers, and acrylic resins.

9. The non-aqueous inkjet orange ink composition according to claim 3, wherein the pigment dispersant is a basic group-containing polymer pigment dispersant.

10. The non-aqueous inkjet orange ink composition according to claim 4, wherein the pigment dispersant is a basic group-containing polymer pigment dispersant.

11. The non-aqueous inkjet orange ink composition according to claim 6, wherein the pigment dispersant is a basic group-containing polymer pigment dispersant.

12. The non-aqueous inkjet orange ink composition according to claim 7, wherein the pigment dispersant is a basic group-containing polymer pigment dispersant.

\* \* \* \* \*